(No Model.)
G. WHITNEY.
PACKAGE OF PHOTOGRAPHIC FILMS.
No. 471,586. Patented Mar. 29, 1892.
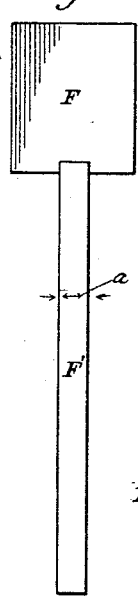
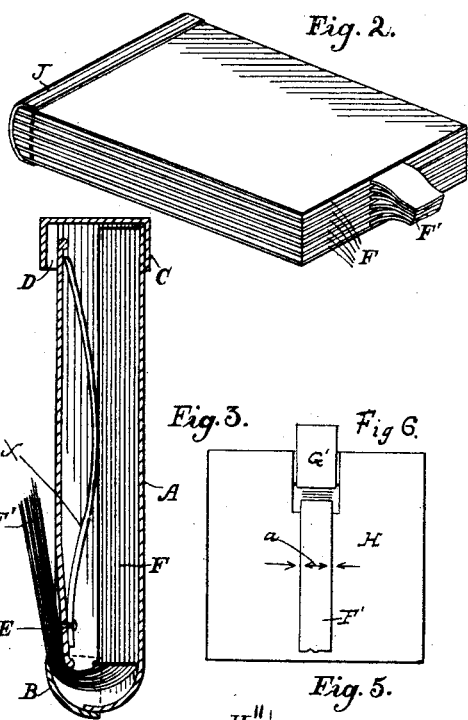
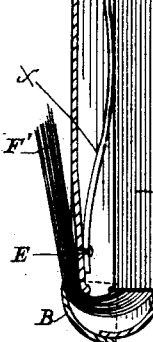
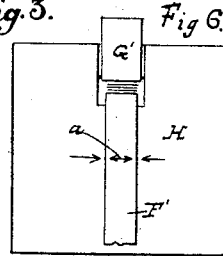
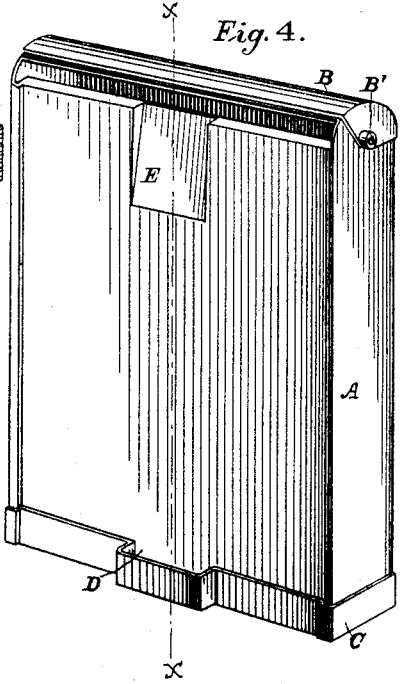
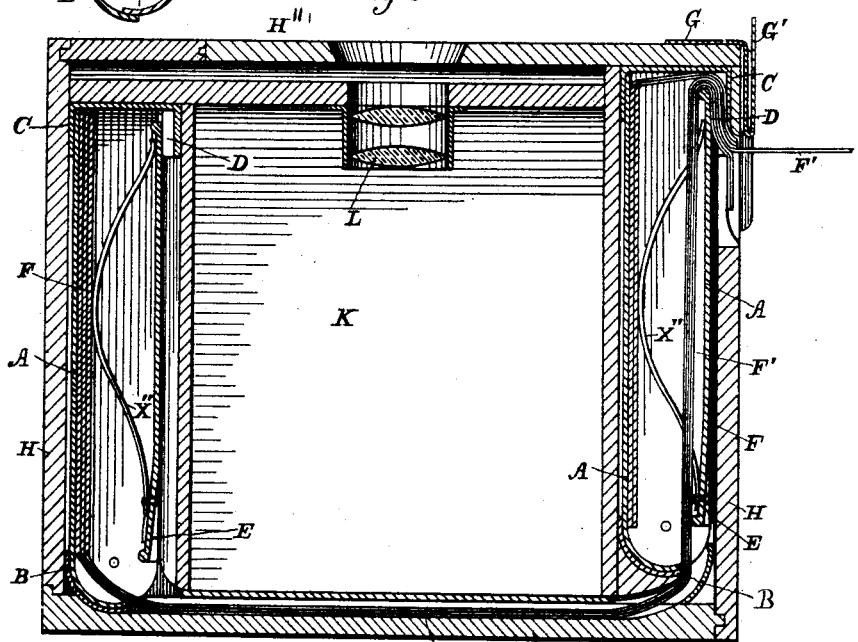
WITNESSES.
Ida C. Barnard
Alvan Macauley.
INVENTOR.
George Whitney
by Church & Church
his ATTORNEYS

UNITED STATES PATENT OFFICE.

GEORGE WHITNEY, OF WINNETKA, ILLINOIS.

PACKAGE OF PHOTOGRAPHIC FILMS.

SPECIFICATION forming part of Letters Patent No. 471,586, dated March 29, 1892.

Original applications filed October 2, 1890, Serial No. 366,847, and December 18, 1890, Serial No. 375,123. Divided and this application filed May 18, 1891. Serial No. 393,148. (No specimens.)

*To all whom it may concern:*

Be it known that I, GEORGE WHITNEY, of Winnetka, in the county of Cook and State of Illinois, have invented a new and useful Improvement in Packages of Photographic Films or Plates; and I do hereby declare the following to be a full, clear, and exact description of the same, reference being had to the accompanying drawings, forming a part of this specification, and to the letters of reference marked thereon.

My present invention has for its objects to provide an improved photographic sensitized surface or plate adapted for use particularly in that class of cameras or plate-holders described in my pending applications Serial Nos. 366,847 and 375,123, filed October 2, 1890, and December 18, 1890, respectively, of which said applications this one is a division, and it has further to provide a package for containing such plates, whereby the plates in closed packages may be placed in a camera or holder and exposed, and after exposure removed in similar closed packages, thereby enabling the plates to be changed in daylight without the necessity of the operator retiring to a darkroom; and to these and other ends the invention consists in the hereinafter-described plate and certain improvements in construction of the package and combinations of its parts, the novel features of which will be pointed out particularly in the claims at the end of this specification.

In the drawings, Figure 1 is a view of a plate made in accordance with my invention; Fig. 2, a perspective view of a package of such plates; Fig. 3, a sectional view of a plate carrying and containing case; Fig. 4, a perspective view of the same when filled; Fig. 5, a sectional view of a camera or plate-holder, showing the application of my film-package thereto. Fig. 6 is a view of a detail of the camera shown in Fig. 5.

Similar letters of reference indicate similar parts.

The sensitized plate F (shown in Fig. 1) may be of any suitable material adapted to serve as a support for a sensitized photographic film, as glass or paper, but is preferably of transparent or translucent celluloid, or some similar material more or less flexible, so as to be capable of being bent to turn corners readily during its manipulation, and to one of its ends is attached a tape or strip F' of flexible material, as thin strong paper, being fastened thereto by mucilage or cement in any well-known manner, and preferably of a length sufficient to pass from a compartment for unexposed plates (in a suitable holder or camera) through a compartment for exposed plates and thence to the exterior of the holder, whereby the plate may be manipulated from the exterior of the holder by drawing on said tape. Upon this tape may be printed, if desired, certain instructions regarding the use and manipulation of the plate, and an indicating-point, as arrow $a$, and a space left for memoranda to be made by the user. These plates are preferably put up for the market arranged between the leaves of a book J, (see Fig. 2,) the latter being formed of sheets of paper, preferably black, secured together at one end and serving as a means of preventing the sensitized plates from sticking to each other, and the next succeeding one being drawn out when the preceding one is removed by means of its attached tape or otherwise.

One manner of and means for using these plates in cameras or plate-holders is fully described in the two applications before referred to, and the next portion of my present invention consists of a convenient supply-case for containing the above-described plates or films-sheets, whereby the full packages may be applied to a holder or camera exposed, and cases containing the exposed plates removed without the necessity of resorting to a dark room for the purpose.

Referring particularly to Figs. 3, 4, and 5, A indicates the supply-case, constructed of pasteboard, papier-maché, or, if desired, metal, being provided at one end with a swinging lid or cover B, having a key-socket B' near its pivotal point and adapted to be opened and closed when within a holder or camera by means of a suitable key. The casing is further provided with a depression or recess E on the side toward which the cover closes for the passage of the plate-tapes when the lid or cover is closed, as shown in Figs. 3 and 4. At the end of the case opposite the hinged cover is arranged a light tight passage D, formed in the present instance in the flanged cover C, provided with a forward extension, as shown, said passage being also adapted for the passage of the plate-tapes, but by reason of its shape preventing the passage of light to the plates within the case. Within this case are also preferably arranged springs X″, secured near the end on which the covers or lids B are located, their free ends projecting toward the opposite side and adapted to hold the plates in contact therewith.

When the package of films shown in Fig. 2 is placed within the supply-cases, it occupies the position shown in Fig. 3, with the ends of the tapes projecting out of the end having the cover thereon, but being protected from light by said cover, which is closed, and the tapes are long enough to pass one or more times around the case, when they may be secured by a band of paper or otherwise.

In Fig. 5 is shown the manner of using my supply-cases in a camera or holder such as described in my prior applications. In this instance the receptacles or holders for the film packages or cases are constructed integral with a camera—that is to say, a lens and exposing-chamber. The letter H indicates the camera-casing, H′ the back lid or cover, and H″ the front, having an exposing aperture, and inside this a partition carrying a lens L and a dark chamber K. The back of the chamber is preferably formed by the cover H′, forming a plate-support having the usual tape-groove, and at opposite sides of the exposing-chamber are receptacles for the plate-supply cases. The operator, having a full and empty supply-case at hand, inserts them in the camera or holder by removing the lids H′ H″ with the full case on the left (in the construction shown) and then passes the tapes from the full case through the groove in the plate H′ and up into and through the empty case on the right, through the light tight passage D, and out through the aperture partly covered by the plate G and hinged plate G′ in convenient position to be grasped from the outside of the casing. Then the slides H′ H″ are closed, and by means of a suitable key inserted from the outside of the holder the lid B of the full case is opened, and when desired to expose a plate the tape F′ of the first one is pulled and the plate drawn out of the full case and back of the exposing-chamber K, where it may be arrested by a catch or stop, as shown in my prior application, Serial No. 375,123, of which this case is a division, or its position may be indicated by a mark on the tape, co-operating with a corresponding one on the casing, as in Fig. 6. After making the exposure the plate may be drawn by its tape up into the empty supply-case on the right or in the receiving-compartment of the holder and when there is pressed up against the side by the springs X″, as shown. The tape is now torn off, and as it contains a number corresponding to one on the plate any memoranda may be made upon it and preserved for future reference, as such memoranda may indicate the subject, length of exposure, or light, which will be useful when the plate is developed.

When all the plates have been transferred and are within the receiving-case, the lid B of the receiving-case may be closed by the application of the lid-operating key and the case removed and the empty one transferred to the other side, when it may be filled in the same manner from another full one applied in the manner described.

By the use of this supply-case the photographer may go into the field fully equipped for a lengthy stay without necessitating his return to the dark-room for the purpose of "loading" his instrument, as the transfers can be made in daylight without liability of fogging the plates or films, or of carrying in his camera a large quantity of sensitized material when only a small quantity is to be used. The plates being of approximately the size of the picture-taking capacity of the camera, any or all can be developed at any time without waste.

It is obvious that the package of plates or the separate plates are capable of use without the supply-cases.

I claim as my invention—

1. As an article of manufacture, a single photographic plate having a tape attached thereto and serving as a means for manipulating said plate in a plate-holder or camera, as set forth.

2. As an article of manufacture, a single photographic plate having a tape attached thereto, said tape being of material adapted to be torn or severed, whereby the plate may be manipulated in a plate-holder or camera and the tape detached therefrom, as set forth.

3. As an article of manufacture, a single flexible photographic plate having a tape attached thereto and serving as a means for manipulating the plate in a plate-holder or camera, as set forth.

4. As an article of manufacture, a package of separate photographic plates, each having a separate tape attached thereto, and a series of connected leaves of paper or similar material placed between them, as set forth.

5. As an article of manufacture, separate photographic plates having a tape attached thereto, upon which latter is an indicating-mark adapted to co-operate with a corresponding mark on a plate-holder and indicate the position of said plate, as set forth.

6. As an article of manufacture, a casing for plates with separate tapes attached, having light-tight tape-apertures at opposite ends, substantially as set forth.

7. As an article of manufacture, a case for plates, having at one end a tape-aperture and at the other a hinged cover, substantially as described.

8. As an article of manufacture, the hereindescribed supply-case for plate-holders, consisting of a case A, the covers B and C, and adapted for containing a package of plates with tapes attached, substantially as described.

9. As an article of manufacture, a case having tape-apertures at opposite ends and a cover or lid at one end and a package of plates located within said case, each plate provided with a tape for removing it, as set forth.

GEORGE WHITNEY.

Witnesses:
CHAS. L. WILLIAMS,
GEO. ZIPPERER.